(12) United States Patent
Hardacker (10) Patent No.: US 7,995,969 B2
(45) Date of Patent: Aug. 9, 2011

(54) MILLIMETER WAVE POWER CONVERSION

(75) Inventor: Robert L. Hardacker, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 837 days.

(21) Appl. No.: 12/069,069

(22) Filed: Feb. 7, 2008

(65) Prior Publication Data

US 2009/0181622 A1    Jul. 16, 2009

Related U.S. Application Data

(60) Provisional application No. 61/020,218, filed on Jan. 10, 2008.

(51) Int. Cl.
*H04B 1/38*        (2006.01)
(52) U.S. Cl. ......... 455/73; 455/106; 455/118; 455/41.2; 455/101; 455/573; 455/102; 375/298; 375/308; 348/724; 348/726; 348/729
(58) Field of Classification Search .................... 455/73, 455/41.2, 42, 101–102, 106, 118, 573; 375/298, 375/308
See application file for complete search history.

(56) References Cited

U.S. PATENT DOCUMENTS

| | | | |
|---|---|---|---|
| 5,204,686 A | 4/1993 | Petrelis et al. | |
| 6,272,329 B1 * | 8/2001 | Sawchuk | 455/326 |
| 6,285,720 B1 * | 9/2001 | Martone | 375/262 |
| 6,839,539 B2 | 1/2005 | Durrant et al. | |
| 7,257,369 B2 | 8/2007 | Weissman | |
| 7,313,423 B2 * | 12/2007 | Griffin et al. | 455/575.2 |
| 7,555,053 B2 * | 6/2009 | Trachewsky et al. | 375/267 |
| 7,596,186 B2 * | 9/2009 | Le Bars | 375/298 |
| 7,688,908 B2 * | 3/2010 | Niu et al. | 375/262 |
| 7,714,783 B2 * | 5/2010 | Niu et al. | 342/377 |
| 7,773,685 B2 * | 8/2010 | Tirkkonen et al. | 375/267 |
| 7,826,554 B2 * | 11/2010 | Haque et al. | 375/297 |
| 2002/0025786 A1 | 2/2002 | Brady et al. | |
| 2002/0128009 A1 | 9/2002 | Boch et al. | |
| 2002/0160796 A1 * | 10/2002 | Fujino | 455/516 |
| 2004/0063456 A1 | 4/2004 | Griffin et al. | |
| 2004/0110469 A1 | 6/2004 | Judd et al. | |
| 2006/0040615 A1 | 2/2006 | Mohamadi | |
| 2006/0056278 A1 | 3/2006 | Le Bars | |
| 2007/0066220 A1 | 3/2007 | Proctor, Jr. | |
| 2008/0137718 A1 * | 6/2008 | Cha et al. | 375/146 |

OTHER PUBLICATIONS

Nathan Davis, "Another Wireless HD Standard Emerges," ninemsn website, Nov. 2, 2006.
"Leading Companies Converge to Advance A/V Connectivity Through New Wireless HD Interest Group," Wireless HD press release, Oct. 31, 2006.

(Continued)

*Primary Examiner* — Marceau Milord
(74) *Attorney, Agent, or Firm* — Miller Patent Services; Jerry A. Miller (57) ABSTRACT

A translation transceiver device consistent with certain embodiments has a 60 GHz band receiver for receiving SD type device compatible transmissions. A demodulator demodulates the SD type transmissions. A decoder decodes the demodulated SD type transmissions into received data. An AD type encoder encodes the received data to produce AD type transmitter compatible data. An AD type modulator modulates the AD type transmitter compatible data, and an AD type 60 GHz band transmitter transmits the modulated AD type transmitter compatible data. This abstract is not to be considered limiting, since other embodiments may deviate from the features described in this abstract.

28 Claims, 6 Drawing Sheets

OTHER PUBLICATIONS

"Ecma Develops 60 GHz Radio Standard," Ecma International press release, Feb. 12, 2007.
"IEEE 802 15 WPAN Millimeter Wave Alternative PHY Task Group 3c (TG3c)," Nov. 30, 2007.
"WirelessHD's 60 GHz Platform Could Spark Standards War," Wireless Watch, Nov. 6, 2006.
International Search Report and The Written Opinion of the International Searching Authority, PCT/US08/87991, Feb. 19, 2009.

* cited by examiner

MILLIMETER WAVE POWER CONVERSION

CROSS REFERENCE TO RELATED APPLICATIONS

This application claims priority benefit of U.S. Provisional Patent Application No. 61/020,218 filed Jan. 10, 2008 which is hereby incorporated by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

There are as many as three types of devices currently under consideration by the various standards groups such as the Institute of Electrical and Electronic Engineers, ECMA International and the WirelessHD special interest group (IEEE 802.15.3c, ecma tg20, WIHD) for use in the 60 GHz band targeting bulk data transfer, high definition multimedia streaming and wireless personal area networking. Standardized terminology and specifications for such devices have not yet been completed, but generally the three devices can be generally thought of as very simple short range devices, more complex intermediate range devices and even more advanced longer range devices.

From a historical perspective, the standards bodies began standardization efforts with only two categories of devices in mind—very simple short range devices and more complex longer range devices. As the standards setting process evolved, the simpler device became more complex and need for a broader array of devices was proposed and appears at this writing to be progressing toward being adopted. At this writing, it appears that three such device categories are headed for standardization; however, it is possible that more or fewer than three may ultimately exit the standards making bodies.

Regardless of the outcome and ultimate number and exact specifications of devices that evolve from the standards bodies, for purposes of this document, simpler devices will be referred to as SD type devices or the like, and more complex devices will be referred to as AD type devices or the like. But, in each case, the designator SD or AD should be taken as a relative term. That is, an SD device is a device that is simpler than an AD device. By way of example, and not limitation, in some embodiments, the first type (a.k.a. advanced device—AD) and the second type (a.k.a. simple device—SD) may have different modulation schemes, bit-rates, superset or subset of the media access control (MAC), return channels, etc. The SD type device may require manual "pointing" of the device in the general direction of its target; whereas, the AD may automatically find its target device and maintain connectivity although the direct line of sight (LOS) path is blocked utilizing various advanced signal processing to produce beam steering and/or beam forming. Generally an AD device will have greater effective range and throughput than an SD, as will be discussed in greater detail later.

Moreover, in the scenario where three device standards ultimately emerge, the term AD may encompass devices with hybrid capabilities of the two most complex devices, while in contrast to the SD. Alternatively, an SD device may encompass the capabilities of a hybrid of the two lower complexity devices. In all cases, however, the terms are to be considered relative in the context of this document.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with certain embodiments consistent with the present invention a lower power device (e.g., having a simple antenna, line of sight (LOS) usage millimeter wave) is converted to a more complex device (e.g., having higher power, more complex antenna, non-line of sight (NLOS), etc). In accord with the present disclosure, the term "line of sight" refers generally to a direct path between devices without substantial intermediate obstructions such as walls and the like, where "non-line of sight" implies the possible presence of signal interfering obstructions as opposed to limitations imposed by the curvature and terrain of the earth (however, such earth curvature and terrain limitations are not precluded).

It is useful to consider the originally proposed standards, which proposed only two types of such devices, which are logically and readily extended to any number of finally adopted standards. As noted above, there were originally two types of mm wave communication devices under consideration by various standards groups (IEEE 802.15.3c, ecma tg20, WirelessHD (a.k.a., WiHD)) for use in the internationally available unlicensed 60 GHz frequency band (meaning the band of frequencies between 57 and 64 GHz in the US and 59-66 GHz in Japan and Europe) targeting bulk data transfer, uncompressed high definition multimedia streaming and wireless personal area networking. Standardized terminology and specifications for such devices have not yet emerged (thus necessitating the use of the coined terminology used herein), but generally the two devices as originally proposed could be characterized as simple short range devices versus more advanced longer range devices. In the example of two device only standards, for purposes of this document, the simpler devices could be referred to as SD type devices or the like, and the more complex devices could be referred to as AD type devices. The two types of devices were proposed to have different modulation schemes, bit-rates, MACs, return channels, etc. The proposed SD type device required manual "pointing" of the device in the general direction of its target whereas the AD as proposed could automatically find its target device and maintain connectivity although the direct line of sight path is blocked (e.g., by use of beam forming and beam steering).

The more complex device type (which can be considered an AD type device) is targeted for streaming media, typically uncompressed High Definition (HD) video, in a non-line of sight (NLOS) mode. Such applications generally call for a complex antenna system capable of beam steering and/or forming technologies, and significant power consumption for both the distance range (generally greater than 10 meters) and duration (continuous operation for hours). AD devices were generally devices having a range of around 10 meters; modulation more sophisticated than that used in SD type devices and may include orthogonal frequency division multiplexing (OFDM) or single carrier block transmission (SC-BT) or other complex modulation schemes; and the antenna system is generally implemented using a more sophisticated antenna array than that of SD type devices, such antenna arrays utilizing for example beam forming and steering and/or Multiple In Multiple Out (MIMO) antenna technology to permit better performance in NLOS conditions and avoid the need for pointing the device toward the target, depending upon the particular specification and implementation thereof. One standards body (ECMA) has called such devices "type A", while another standards body (WiHD) has proposed the names "station" or "coordinator". Data rate proposals for AD type devices were proposed to be in the range of approximately 1 and 10 Gbps, potentially increasing to 20 Gbps or more. The primary use case for a "type A" device is streaming uncompressed HD video with bit-rates in excess of 3.2 Gbps MAC SAP.

The second device type (which under the two device standards proposals could be referred to herein as the SD type device) was targeted for portable applications requiring low power, and typically using a simple perhaps directional antenna that would require the user to "point" the device in the general direction of use. The ECMA refers to such devices as type B or type C, with type C having a 1M range and a type B having a 3M range. The primary application is for file transfer operating in an LOS (line of sight) environment from approximately less than one meter or less than several meters away from the receiving device. Although not precluded as an application, streaming media from the SD type device is possible, but would present a power drain without using a charger and its utility would be further restricted by have limited range. Generally speaking, such SD devices utilize a simple un-steered (and likely directional) antenna configuration; simpler modulation such as quadrature amplitude modulation (QAM), binary phase shift keying (BPSK), or on-off keying (OOK) modulation for example; ranges of <1 meter or <3 meters (but generally, less than about 5 meters can be assumed, but varies based upon the standard and implementation thereof); low power consumption to facilitate battery power; and data rates in the range of several hundred Mbps (e.g., 380 Mbps was proposed for a type C ECMA device) to several Gbps.

At this writing, the standards bodies appear to be migrating from the more simple two device concept to a three device concept. For purposes of differentiation, but not by way of distinction from the ability to classify devices based upon their relative complexity, throughput and feature set, one can consider the more recent proposals as being type I, type II and type III, for lack of a standardized set of terminology, respectively descending from most complex to simplest. (One can also think in terms such as advanced, intermediate and simple, or advanced, simple and very simple, but nevertheless, any two such devices can be considered in relation to one another by the SD and AD device distinctions as coined above).

By way of example and not limitation, in the case of three device types as is being proposed, one possibility of the characteristics of such devices is as follows:

A type I device might be characterized as having a complex modulation system such as OFDM with several hundred carriers capable of a relatively high data rate (e.g., 4-6 GHz, with specifications comparable with the originally proposed advanced device); Beam forming and beam steering capability permitting the device to steer an antenna beam around a slow moving object by using alternative and perhaps indirect paths, relatively higher power and the associated higher demands for power consumption.

A type II device with intermediated capabilities evolved as features were added to the most simple device rendering it too power hungry for its originally intended use, but enabling it to have greater file transfer capabilities and longer range. As such, it evolved to have moderately complex modulation and intermediate power for ranges of approximately three meters or so. Such devices might, incorporate features such as beam forming, but might exclude beam steering for example. As with all proposed standards being discussed, the exact feature set is yet to be determined at this writing.

A type III device more or less retains the character of the originally envisioned simplest of the two device scenario, having only simple modulation scheme(s) (e.g. ASK or OOK) with a simple directional antenna and low power for file transfer at less than about 500 Mbps, and remains envisioned primarily for use in hand-held portable devices such as MP3 players, PDAs and the like.

Based upon these types, an exemplary translator/transceiver consistent with embodiments of the present invention can take the lower data rates/simpler modulations of types II or III, transcode them to a high speed modulation of type I and use the advanced beam steering, beam forming and power techniques of type I while forming the appropriate framing, headers, preambles etc. Of course the reverse is achieved in the reverse direction with the transceiver slowing the data transfer rate of the faster type I device by either buffering or using acknowledgements (ACK) or other control methods or combinations thereof to reduce the data rates to the type II and/or type II devices to that which they can support.

Therefore, with this historical perspective, it remains convenient and appropriate to consider the 60 GHz devices in the context of their relative complexity. Hence, the terms SD and AD will be used throughout as relative terms. So, for example, in a three device scenario, an AD/SD pair of devices could be any of the following: type I/type II, or type I/type III, or type II/type III. Moreover, one can readily envision that, depending upon the final standard; one might encounter devices with the hybrid capabilities of type I+type II, or type II+type III. In such cases, an AD/SD pair of devices could be embodied as a type I/(type II+type III), or a (type I+type II)/type III. Of course, the concept can be logically extended to any number of devices should the standards organization expand the number of device categories beyond the two or three being proposed at present. Devices of these types should support mandatory standardized modes, may support optional standardized modes and may even support proprietary modes all of which may increase the supported data rates and modulation schemes.

Devices consistent with embodiments of the present invention are generally intended to maximize the available performance of the simpler device by supporting the optional modes to the SD while bridging to the supported modes for the AD. Hence, the SD and AD devices as discussed herein are generally defined in relative terms as discussed above. However, it should be noted that at this writing the standards for such SD and AD devices have not been finalized and are thus subject to change. However, regardless of the final standardization of these technologies, those skilled in the art will readily understand which device falls into which category upon consideration of the present teachings, by virtue of their relative capabilities. The classifications are made relative to one another so that any two such mm wave devices can be classified in accord with their complexity and capabilities when compared to the other. Hence, the exact specifications called out above may not be strictly applicable by the time the standards are finalized. Relative terms such as higher or lower data rates or ranges are always used in connection with a comparison between the SD and AD devices.

Despite their relatively short range and lower data rate, even the simplest of the SD type devices may find application in transmission of streaming video or other applications, in which the limited range or throughput of such devices renders its application inconvenient for the user. In accordance with embodiments consistent with the present invention, an adapter to convert the SD type devices to the AD type devices (as defined above to include two or three types of devices defined in relative terms) temporarily is provided such as for providing for more convenient communication within a home environment without the limitations imposed by the SD type device capabilities.

Figure 1:
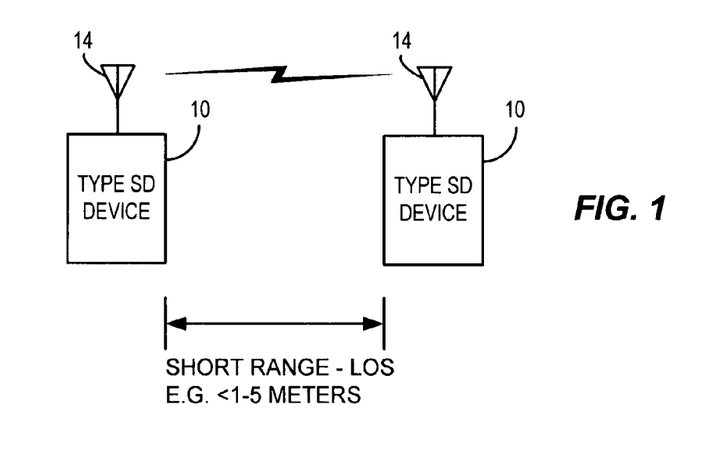
FIG. 1 is a diagram depicting communication between two SD type devices.

Referring now to FIG. 1, one contemplated usage of a type SD type device is depicted. In this illustration, two SD type devices 10 communicate with each other using their respective antennae 14 over a short range, and likely in a line of sight communication modality with the two devices 10 being separated by a relatively short range (e.g., no more that a few meters, e.g., less than one to three or five meters), and probably without intermediate obstructions to the line of sight. Such communication might generally be carried out by pointing the devices toward one another to capitalize on antenna directionality gain. Relatively simple modulation and detection schemes provide for data communication at comparatively low data rates under optimal conditions.

Figure 2:
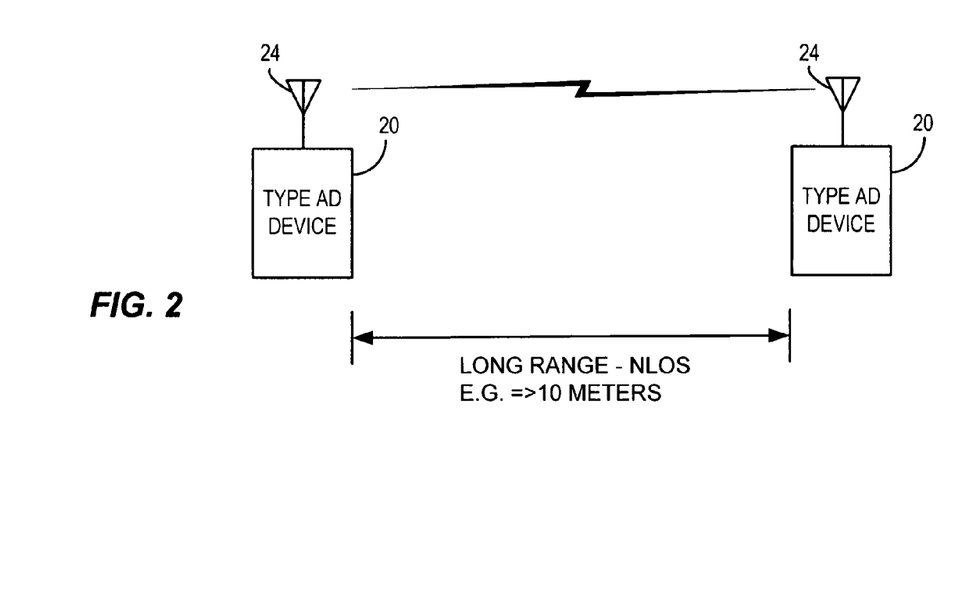
FIG. 2 is a diagram depicting communication between two AD type devices.

The conventional type AD devices 20, are depicted in FIG. 2 wherein the devices 20 utilize more sophisticated modulation, beam forming and/or steering antennae 24 and higher power transmission to permit NLOS communication over greater distances (e.g., around 10 meters or perhaps greater). While not depicted in the illustration, there may be various obstacles to line of sight without noticeable deterioration in the ability of the two AD devices to communicate.

Figure 3:
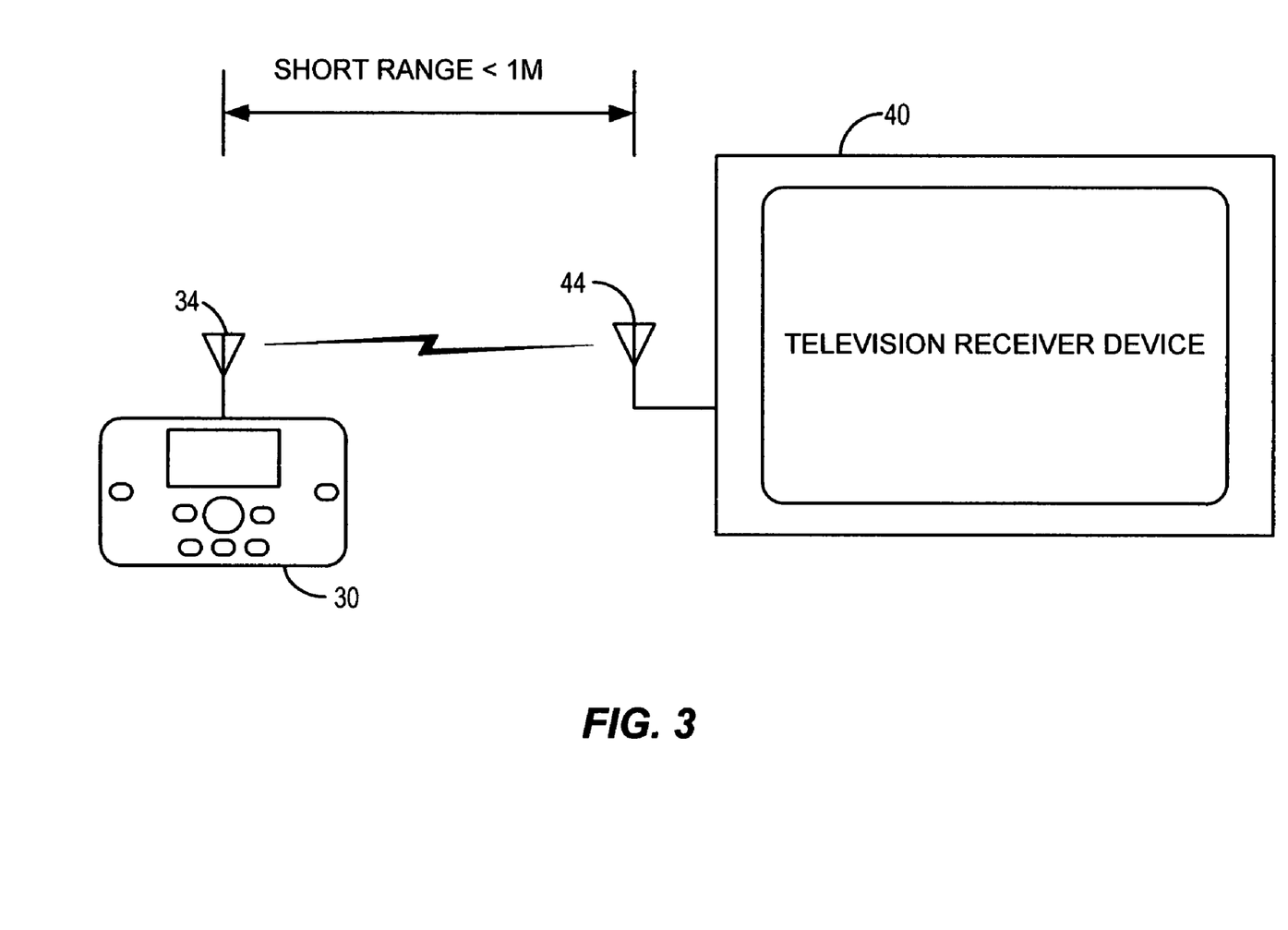
FIG. 3 is a diagram depicting use of an SD type device embodied in a hand held apparatus in communication with a television receiver device.

Now consider the example application depicted in FIG. 3. In this application, the SD type device is embodied in a hand-held appliance 30 having a simple antenna 34 which may find application in transmission of streaming video to a television receiver device 40 (e.g., television set, set top box, or other video receiver device) via its antenna 44. In this application, the limited range of SD type devices could render its application inconvenient for the user since it is designed for lower duty applications and shorter range. Thus, to utilize this SD device to stream video to the television receiver device 40, the device might need to be held or placed within a short distance (e.g., one meter or so) of the television receiver device and stably pointed toward the television receiver device. Additionally, although the SD devices are lower power, continuous transmission of streamed video may be taxing on the batteries supplying power thereto, thus necessitating use of a power adapter to further complicate the process. In accordance with embodiments consistent with the present invention, an adapter to convert the SD type devices to the AD type devices temporarily is provided such as for providing for more convenient communication within a home environment. For purposes of this document, such a device is referred to as a transceiver docking station (TDS) or equivalently a translation transceiver which translates or transcodes the respective communications carried out in both directions. However, it is to be noted that embodiments consistent with the present invention may not incorporate an actual mechanical docking station or cradle, but may operate by simple placement of the SD in appropriate proximity to the translation transceiver.

The term "docking station" is to be interpreted broadly to suggest that an SD device can be coupled thereto, electrically and/or mechanically. The docking station may incorporate a cradle or other mechanical structure that physically receives the SD device and holds it in physical juxtaposition so as to permit proper operation. In certain other embodiments, the docking station may incorporate other mechanisms to provide for electrical connection for transfer of data and/or provide power to the SD type device. While a docking station incorporating a cradle to receive the SD type device is currently preferred, other mechanical and electrical configurations will occur to those skilled in the art upon consideration of the present teachings.

Figure 4:
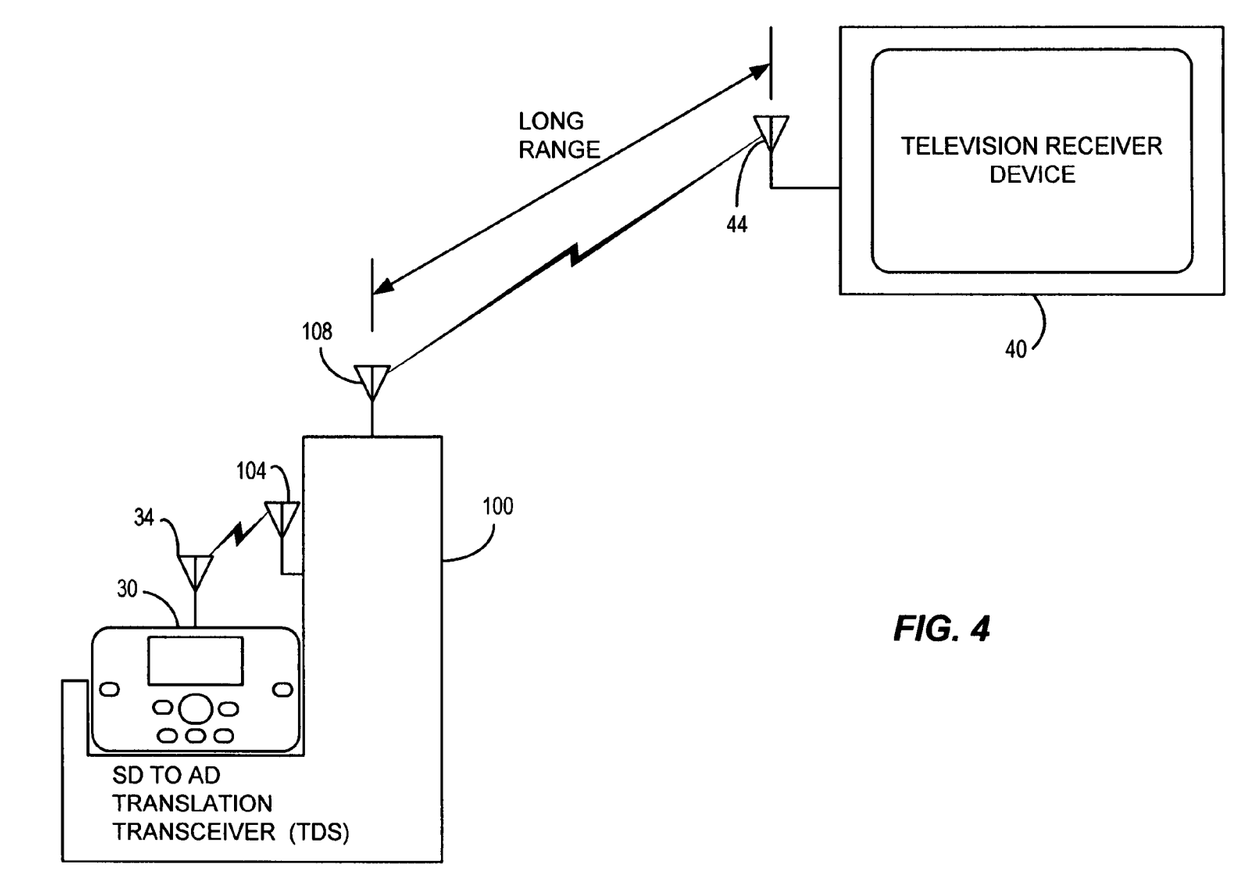
FIG. 4 is a diagram depicting longer range non-line of sight (NLOS) communication using a TDS in a manner consistent with certain embodiments of the present invention.

A transceiver docking station (TDS) 100 incorporating a cradle for receipt of the SD type device and a translating/transcoding transceiver is broadly depicted schematically in one embodiment in FIG. 4. TDS 100 acts as a transceiver to the SD and relays the data from the SD while converting the transmitted and received signaling signals to a format that is compatible with an AD. In the preferred embodiment, the AD side of the docking station has all of the mandatory features of the more complex AD specification as well as all optional features, but this should not be considered limiting since the various optional feature set may continuously evolve. In the present embodiment, the docking station can be essentially non-contact, having a cradle to place the SD device that points the SD device towards the TDS SD radio antenna 104. The signals from the SD device are received (transmitted) and converted from an SD type MAC to an AD type MAC where they establish communication with the intended AD type device via the antenna 108 (preferably an intelligent antenna array) recipient device such as the television receiver device 40. This effectively creates a converter between SD and AD type devices supporting both the short range, control signals, modulation scheme(s) and data rates of a SD while then converting the data to AD compatible modulations, control, longer range, and higher data rates. In the case of mismatched data rates, null packets may be substituted as necessary in the AD communication stream. The TDS would utilize an AD transceiver and antenna array to support the NLOS communications. Thus, the TDS 100 acts essentially as an AD type device that allows the SD type device to "dock" with it (literally or functionally) and relays the SD type data and control signals with higher power to the intended recipient device using a more robust AD type communication channel.

This allows an SD type device to, for example, send/receive content to/from an AD type device across a large room while running continuously. One exemplary use would be in the case of the Sink device (recipient device—e.g. the television receiver device 40) that does not have sufficient storage space or for some other reason is unable to receive a file transfer from the SD type device, thus necessitating file streaming. By use of the present TDS, the disadvantage of the limited range is eliminated, and thus the possible necessity of standing less than 1 meter from the television receiver device 40 while pointing an SD device at the television receiver device to stream a movie from a portable device such as SD type device 30, for example. AGC can be utilized to produce appropriate signal levels for the distance involved. The control channels of AD and SD type device standards are supported as required to implement any required control signaling, and translation between AD and SD type signaling.

At close range the SD 30 and TDS 100 would be able to readily signal one another to reduce power to an optimal low power level. This low power level for transmission from the SD type device 30 will serve to extend the battery life of the SD type device 30 while allowing for spectral re-use and minimizing interference. Shielding can be used in the TDS 100 to prevent the AD type device's transmitted signal from interfering with the SD type device 30 in the case of AD spectral re-use or other interference. The throughput of the transceiver docking station 100 when transmitting is limited to the lower throughput of the SD type device 30, but the data rate may exceed that of the SD type device 30, hence, insertion of null packets or other information can be used for data rate matching. In certain implementations, a power supply or charger circuit can be provided to the docking station to charge or power the SD type device. This can be realized in the form of simple power plug connector or contacts or by non-contact inductive charging. Such charging circuits are optional and may not appear in all embodiments consistent with the present invention.

Figure 5:
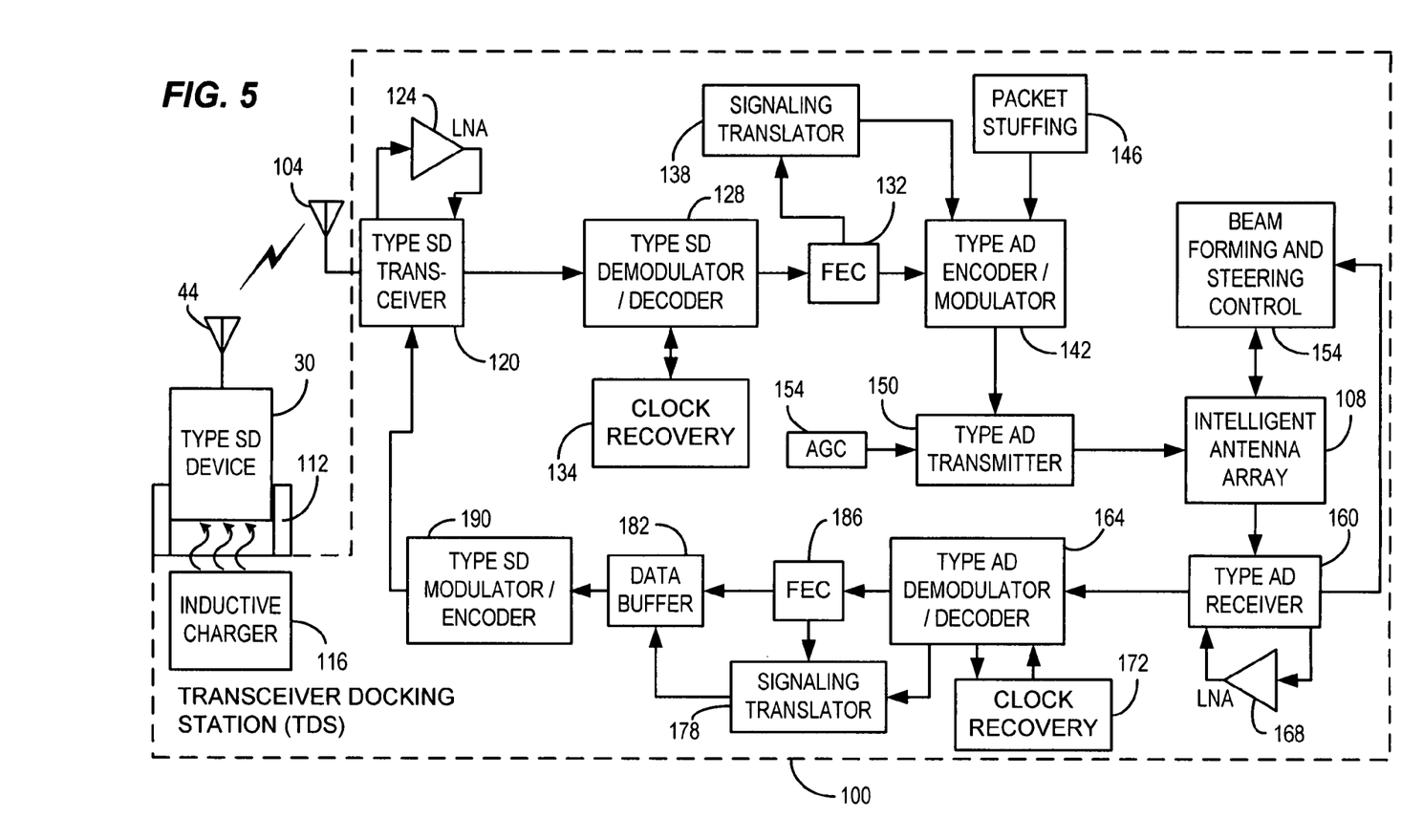
FIG. 5 is a block diagram of a transceiver docking station with an inductive charger mechanism consistent with one embodiment of the present invention.

Turning now to FIG. 5, a transceiver docking station 100 consistent with certain embodiments is depicted. In this embodiment, the type SD device 30 docks in a cradle or other convenient receptacle, shown schematically as 1 12, in order to place the SD type device 30 in close proximity to the TDS 100 and appropriately orient the antenna for good reception by TDS 100 at antenna 104. In the embodiment depicted, an inductive charging mechanism 116 is provided in order to charge/recharge/power the SD type device 30, but other arrangements are also possible as will be described later.

The TDS 100 may take a number of forms from a circuit perspective, with a relatively detailed representation shown in this figure. It should be noted, however, that the exact circuit configuration may vary in accord with the final specifications for SD and AD type devices as the standards evolve, without departing from embodiments consistent with the present invention. In this embodiment, signals from the SD type device are received at the antenna 104 and are processed by a receiver portion of an SD type transceiver 120 to produce a down-converted signal for processing. The signal from the SD type device may be processed by a low noise amplifier (LNA) as part of the receiver's operation and such LNA 124 is shown externally for convenience but can be considered a part of the receiver portion of transceiver 124. Such LNA 124 is generally located early in the signal chain in order to preserve the signal to noise ratio of the incoming signal rather than at the output and may also provide gains of <1 in order to attenuate an input signal that is too strong. Hence, LNA 124 may in fact be realized as an attenuator in some embodiments. The LNA 124 may incorporate AGC (not shown).

From the SD type transceiver, the down-converted signal is passed to the type SD demodulator/decoder 128 which demodulates the SD signal in accord with any (and preferably all) of the modulation schemes provided for the SD type device standard. The demodulating and decoder 128 also preferably incorporates a forward error correction decoder and encoder (FEC) 132 shown externally in this illustration for error correction of data and signaling received from the type SD device 30.

The SD demodulator/decoder 128 also incorporates a clock recovery circuit 134 which, for example, uses a phase locked loop (PLL) and a reference clock for recovery of clocking information from the received signal from the SD type device 30 so as to synchronize with the SD type device 30 and permit accurate data recovery. Such clock recovery can be carried out in any conventional manner.

Once data and signaling are decoded at demodulator/decoder 128, the signaling is translated from SD compatible signaling to AD compatible signaling at signaling translator block 138. The error corrected data are passed from FEC 132 to a type AD encoder/modulator 142, as is the translated signaling from signaling translator 138. This translated signaling and recovered data are then modulated and encoded according to type AD device specifications at 142. The type AD device may have a much larger bandwidth than the type SD device, so packet stuffing can be used at 146 to provide filler to equalize the transmitted data rate between the two formats. The output of the type AD encoder/modulator is then supplied to a type AD transmitter 150, which may be AGC controlled by AGC 154 in order to reduce transmitted power to that needed for solid communications with the recipient device (e.g., TV 40). The transmitter then delivers its output to intelligent antenna array 108 for transmission. Antenna array 108 may operate using beam forming and steering control 154 in accord with proposed standards.

The present embodiment presumes two-way communication, in which case the intelligent antenna array 108 (or a separate intelligent antenna array) also receives incoming signals, for example from the television receiver device 40, and the antenna characteristics are manipulated by block 154 to optimize reception of same. The received signal at the intelligent antenna array 108 is processed at AD type receiver 160 to down-convert the received signal for decoding and demodulation at type AD demodulator/decoder 164. As with the receiver part of transceiver 120, type AD receiver 160 may incorporate a low noise amplifier 168 or attenuator, and type AD demodulator/decoder 164 may incorporate a clock recovery circuit 172.

The signaling translation from AD type signaling to SD type signaling is carried out at signaling translator 178 and such signaling is passed along to a data buffer 182 that is used to assist in data rate equalization of the potentially higher data rate type AD data when converted to type SD data. In addition to the use of data buffering, the device 100 may also signal the AD source of data to "throttle" the data rate using various signaling techniques (such as for example acknowledgement protocols or other data rate matching techniques) in order to match the lower abilities of the SD device 30. The demodulated data are similarly error corrected and error correction encoded at FEC 186 and this data are similarly passed along to type SD modulator/encoder 190 for transmission by the transmitter portion of transceiver 120 to the SD device 30.

It is noted that the block size for type AD and type SD communication standards may not be the same (e.g., a 10×10 block of data versus a 16×22 block, by way of an illustrative example—not per the standard which is still under debate). The demodulation and decoding operation as well as the modulation and encoding operations described above would, in part, involve converting the data from one block format to another. The Forward Error Correction discussed is intended to represent schematically the functions of both correction of errors in received data as well as adding error correction encoding to data that are to be retransmitted. Those skilled in the art will appreciate that the location and specific arrangement of the FEC blocks may be altered from that shown in order to accomplish these functions.

In one embodiment, the FEC block can form a part of the demodulation function. This FEC block identifies and corrects errors in the demodulated data. Another FEC block forms a part of the encoding and modulating block in order to add error correction encoding to the outgoing data. The FECs for the type SD devices and the type AD devices may not necessarily be the same, just as the block sizes may vary. However, in any event, the error correction encoding should conform to the SD or AD standard to which they are applied, once such standards are established. Moreover, in preferred embodiments, each device would optimize the block size and FEC per mandatory and optional standards that apply.

In accordance with preferred implementations, the type SD demodulator/decoder should support all required modulation types and data rates as well as all optional modulation and data rates. When so implemented, this allows the transceiver to communicate with any type SD device and can arrange for a communication mode which maximizes the communication link to the fastest the type SD device can support.

The type AD encoder/modulator similarly should preferably support all mandatory modulation schemes and data rates as well as all optional modulation schemes and data rates in order to permit the transceiver to communicate with any type AD device while maximizing the communication link for the fastest communication the that the type AD device supports.

The same criteria should preferably apply to the type SD modulator/encoder and the type AD demodulator and decoders. However, those skilled in the art will appreciate that variations from these preferences can be implemented without departing from embodiments consistent with the invention.

It should also be noted that the type AD transmitter may utilizes one or more external or internal adjustable or fixed power amplifiers without departing from embodiments consistent with the present invention.

Figure 6:
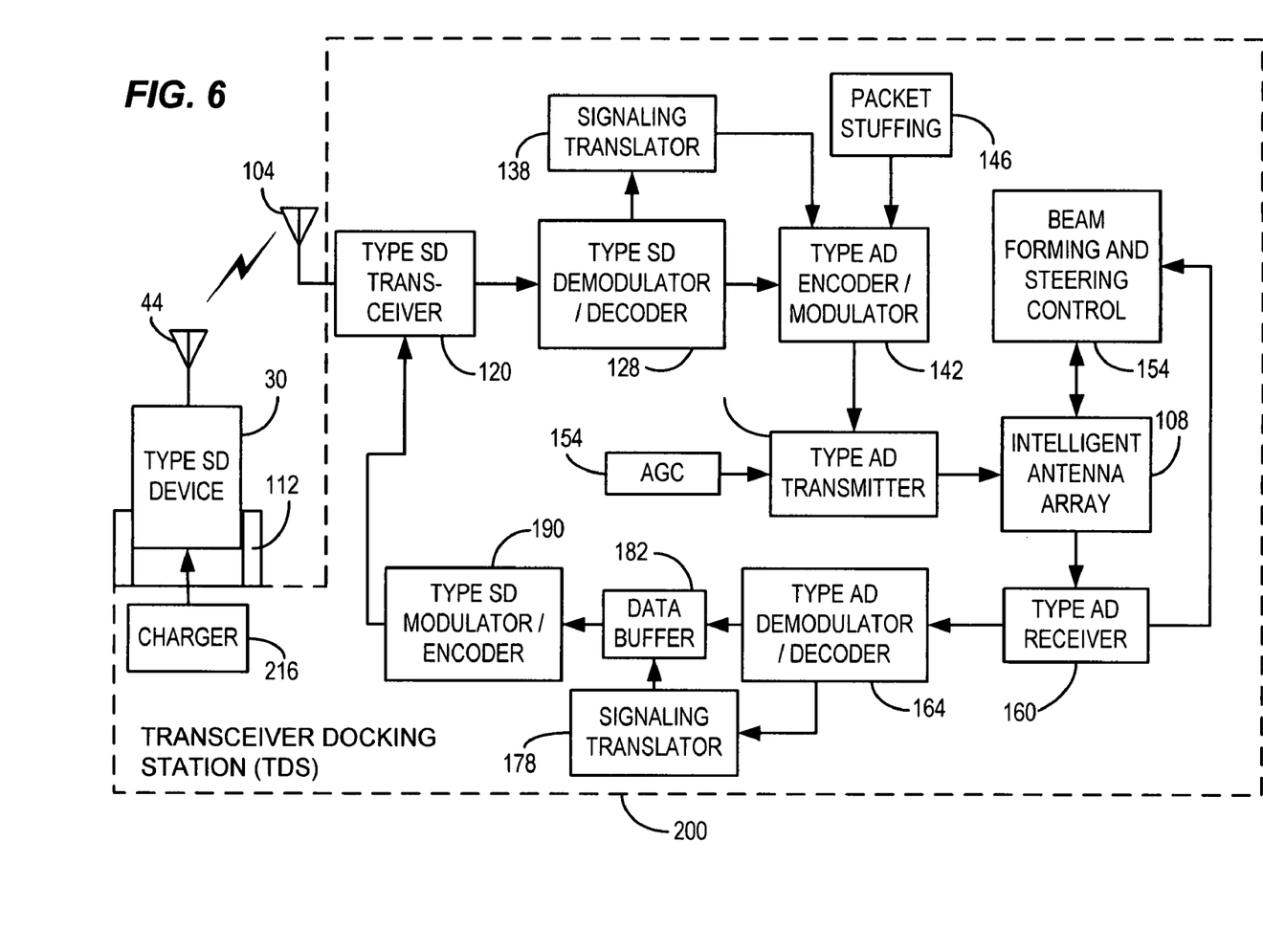
FIG. 6 is another embodiment of a transceiver docking station with a wired charger configuration consistent with certain embodiments of the present invention.

Referring now to FIG. 6, another embodiment 200 of a TDS is depicted. This embodiment may, for example, be identical to the embodiment shown as TDS 100 in FIG. 5, except that the charging mechanism 216 is directly wired via any suitable hard connection terminals or wiring rather than reliance upon inductive charging as in charger 116. Hence, both direct and indirect charging (and power supply) functions are contemplated in any number of variations in varying embodiments. In this illustration, the transceiver diagram has been simplified somewhat by omitting explicit inclusion of clock recovery and LNAs, but it is to be understood that these functions may be carried out within associated functional blocks. Deletion from this illustration is for simplifying the illustration; however, many realizations may be possible without departing from embodiments consistent with the present invention and will be evident to those skilled in the art upon consideration of the present teachings.

Figure 7:
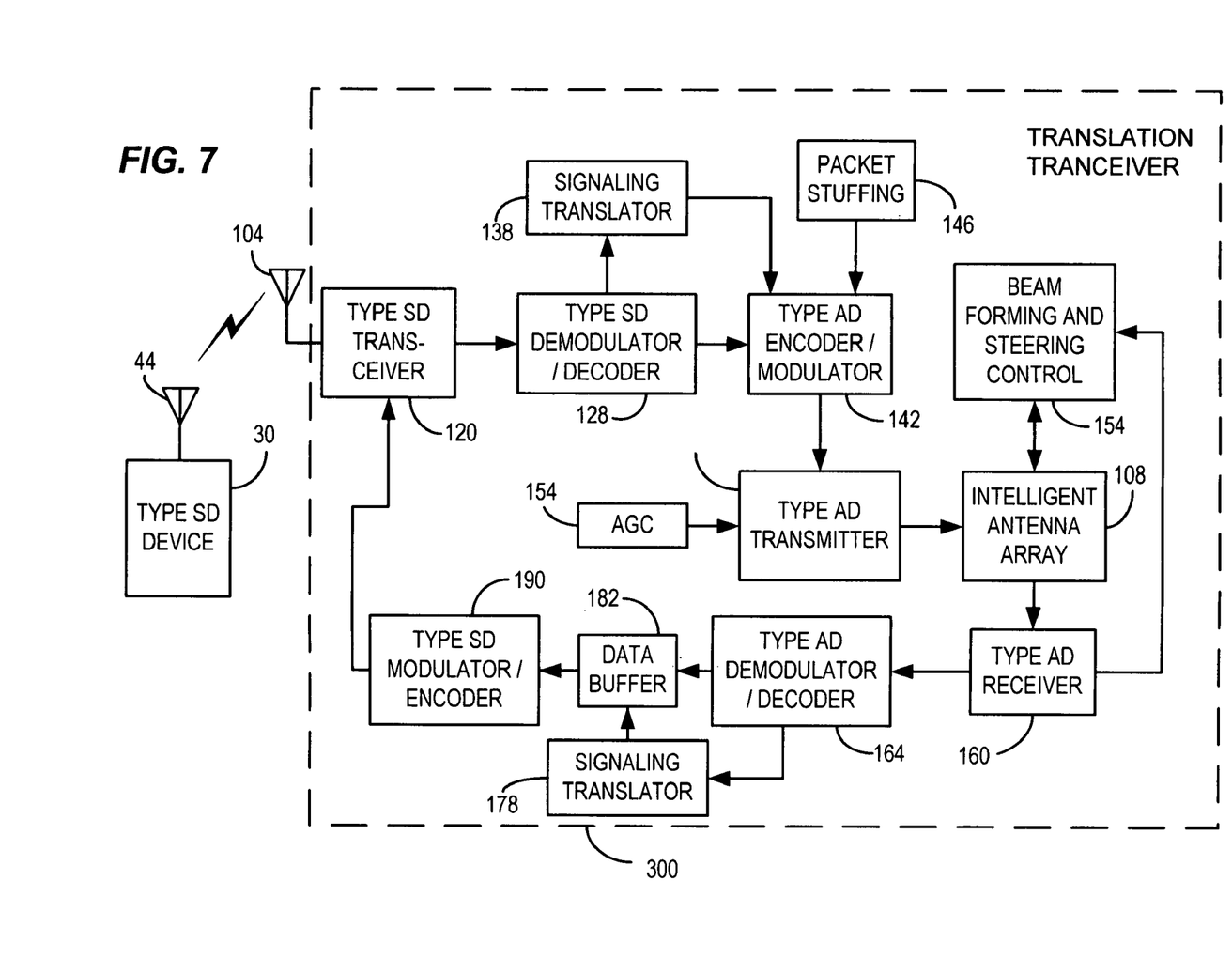
FIG. 7 is a block diagram of a transceiver translator that uses no cradle or charging as an integral part thereof consistent with certain embodiments of the present invention.

FIG. 7 depicts yet another embodiment 300 wherein a docking station or cradle device may or may not be present and a charging mechanism is not depicted. Thus, the translation from SD to AD and AD to SD can be carried out independently of any charging operation and may be realized in a translation transceiver that functions equivalently with the SD type device 30 merely place within proximity of the translation transceiver device 300 without a physical interconnection of any sort. Such an embodiment may be operated by merely, for example, placing the type SD device on a table or other location close to the translation transceiver 300. Any charging or powering functions used by the type SD device may be independently utilized in a normal manner to either charge or power the device without need for such power to be supplied by the translation transceiver 300. It is also noted that the embodiments 100 and 200 of TDS devices are in fact translation transceivers that incorporate some docking and/or charging functions. Hence the terms may be utilized interchangeably with the understanding that the term TDS is intended to include a cradle or other receptacle for the type SD device 30, either with or without any integral charging or power supplying mechanism.

Thus, in accord with certain embodiments, a translation transceiver device has a 60 GHz band receiver for receiving SD type device compatible transmissions. A demodulator demodulates the SD type transmissions. A decoder decodes the demodulated SD type transmissions into received data. An AD type encoder encodes the received data to produce AD type transmitter compatible data. An AD type modulator modulates the AD type transmitter compatible data. An AD type 60 GHz band transmitter transmits the modulated AD type transmitter compatible data. A 60 GHz band receiver receives AD type device compatible transmissions. A demodulator demodulates the AD type transmissions. A decoder decodes the demodulated AD type transmissions into received data. An SD type encoder encodes the received data to produce SD type transmitter compatible data. An SD type modulator modulates the SD type transmitter compatible data. An SD type 60 GHz band transmitter transmits the modulated SD type transmitter compatible data.

In certain embodiments, the translation transceiver device further has a charger for charging a battery of the SD type transceiver. In certain embodiments, the AD type transmitter transmits and the AD type receiver receives using a beam formable and steerable antenna array. In certain embodiments, the translation transceiver device has a cradle for mechanically receiving the SD type device. In certain embodiments, the translation transceiver device has a power source for supplying power to the SD type device for charging or power the SD type device. In certain embodiments, the power source can be either a direct connecting power source or an inductive power source.

In another embodiment, a translation transceiver device has a 60 GHz band receiver for receiving SD type device compatible transmissions. A demodulator demodulates the SD type transmissions. A decoder decodes the demodulated SD type transmissions into received data. An AD type encoder encodes the received data to produce AD type transmitter compatible data. An AD type modulator modulates the AD type transmitter compatible data. An AD type 60 GHz band transmitter transmits the modulated AD type transmitter compatible data.

In certain embodiments, the translation transceiver device has a charging circuit for charging a battery of the SD type transceiver. In certain embodiments, the translation transceiver device has a 60 GHz band receiver for receiving AD type device compatible transmissions; a demodulator for demodulating the AD type transmissions; a decoder for decoding the demodulated AD type transmissions into received data; an SD type encoder for encoding the received data to produce SD type transmitter compatible data; an SD type modulator for modulating the SD type transmitter compatible data; an SD type 60 GHz band transmitter for transmitting the modulated SD type transmitter compatible data; and wherein the AD type transmitter includes a beam formable and steerable antenna array.

In certain embodiments, the translation transceiver device has a cradle for mechanically receiving the SD type device. In certain embodiments, the translation transceiver device has a power source for supplying power to the SD type device for charging or power the SD type device. In certain embodiments, the power source comprises one of a direct connecting power source and an inductive power source.

Another translation transceiver device has a 60 GHz band receiver for receiving SD type device compatible transmissions. A demodulator demodulates the SD type transmissions. A decoder decodes the demodulated SD type transmissions into received data. An AD type encoder encodes the received data to produce AD type transmitter compatible data. An AD type modulator modulates the AD type transmitter compatible data. An AD type 60 GHz band transmitter transmits the modulated AD type transmitter compatible data. A 60 GHz band receiver receives AD type device compatible transmissions. A demodulator demodulates the AD type transmissions. A decoder decodes the demodulated AD type transmissions into received data. An SD type encoder encodes the received data to produce SD type transmitter compatible data. An SD type modulator modulates the SD type transmitter compatible data. An SD type 60 GHz band transmitter transmits the modulated SD type transmitter compatible data. A beam formable and steerable antenna array is provided, wherein the AD type transmitter and AD type receiver uses the beam formable and steerable antenna array. A cradle mechanically receives the SD type device. A power source supplies power to the SD type device for charging or power the SD type device.

In certain embodiments, the power source comprises one of a direct connecting power source and an inductive power source. In certain embodiments, first and second clock recovery circuits recover clock signals from the AD type received signal and the SD type received signal respectively.

In certain of any of the above embodiments, the SD type device can be a device with hybrid capabilities of a type I device and a type II device. In certain of any of the above embodiments, the AD type device can be a device with hybrid capabilities of a type II device and a type III device. In certain of any of the above embodiments, the SD type device can be one of a type I device and a type II device. In certain of any of the above embodiments, the AD type device can be one of a type II device and a type III device.

While certain embodiments herein were described in conjunction with specific circuitry that carries out the functions described, other embodiments are contemplated in which certain of the circuit functions are carried out using equivalent programmed processors. For example, the beam steering, signal translation, decoding, etc. may be carried our using a programmed processor device. General purpose computers, microprocessor based computers, micro-controllers, optical computers, analog computers, dedicated processors, application specific circuits and/or dedicated hard wired logic, analog circuitry, pluralities of such devices and combinations of such devices in centralized or distributed configurations may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A translation transceiver device, comprising:
    a 60GHz band receiver for receiving SD type device compatible transmissions;
    a demodulator for demodulating the SD type transmissions;
    a decoder for decoding the demodulated SD type transmissions into received data;
    an AD type encoder for encoding the received data to produce AD type transmitter compatible data;
    an AD type modulator for modulating the AD type transmitter compatible data;
    an AD type 60GHz band transmitter for transmitting the modulated AD type transmitter compatible data;
    a 60GHz band receiver for receiving AD type device compatible transmissions;
    a demodulator for demodulating the AD type transmissions;
    a decoder for decoding the demodulated AD type transmissions into received data;
    an SD type encoder for encoding the received data to produce SD type transmitter compatible data;
    an SD type modulator for modulating the SD type transmitter compatible data; and
    an SD type 60GHz band transmitter for transmitting the modulated SD type transmitter compatible data.

2. The translation transceiver device according to claim 1, further comprising charging means for charging a battery of the SD type transceiver.

3. The translation transceiver device according to claim 1, wherein the AD type transmitter transmits and the AD type receiver receives using a beam formable and steerable antenna array.

4. The translation transceiver device according to claim 1, further comprising a cradle for mechanically receiving the SD type device.

5. The translation transceiver device according to claim 1, further comprising a power source for supplying power to the SD type device for charging or power the SD type device.

6. The translation transceiver device according to claim 5, wherein the power source comprises one of a direct connecting power source and an inductive power source.

7. The translation transceiver according to claim 1 wherein a data throughput of the SD type device is optimized.

8. The translation transceiver device according to claim 1, wherein the SD type device comprises a device with hybrid capabilities of a type I device and a type II device.

9. The translation transceiver device according to claim 1, wherein the AD type device comprises a device with hybrid capabilities of a type II device and a type III device.

10. The translation transceiver device according to claim 1, wherein the SD type device comprises one of a type I device and a type II device.

11. The translation transceiver device according to claim 1, wherein the AD type device comprises one of a type II device and a type III device.

12. A translation transceiver device, comprising:
    a 60GHz band receiver for receiving SD type device compatible transmissions;
    a demodulator for demodulating the SD type transmissions;
    a decoder for decoding the demodulated SD type transmissions into received data;
    an AD type encoder for encoding the received data to produce AD type transmitter compatible data;
    an AD type modulator for modulating the AD type transmitter compatible data; and
    an AD type 60GHz band transmitter for transmitting the modulated AD type transmitter compatible data.

13. The translation transceiver device according to claim 12, further comprising charging means for charging a battery of the SD type transceiver.

14. The translation transceiver device according to claim 13, further comprising:
    a 60GHz band receiver for receiving AD type device compatible transmissions;
    a demodulator for demodulating the AD type transmissions;
    a decoder for decoding the demodulated AD type transmissions into received data;
    an SD type encoder for encoding the received data to produce SD type transmitter compatible data;
    an SD type modulator for modulating the SD type transmitter compatible data;
    an SD type 60GHz band transmitter for transmitting the modulated SD type transmitter compatible data; and
    wherein the AD type transmitter includes a beam formable and steerable antenna array.

15. The translation transceiver device according to claim 14, further comprising a cradle for mechanically receiving the SD type device.

16. The translation transceiver device according to claim 14, further comprising a power source for supplying power to the SD type device for charging or power the SD type device.

17. The translation transceiver device according to claim 16, wherein the power source comprises one of a direct connecting power source and an inductive power source.

18. The translation transceiver device according to claim 14, wherein the SD type device comprises a device with hybrid capabilities of a type I device and a type II device.

19. The translation transceiver device according to claim 14, wherein the AD type device comprises a device with hybrid capabilities of a type II device and a type III device.

20. The translation transceiver device according to claim 14, wherein the SD type device comprises one of a type I device and a type II device.

21. The translation transceiver device according to claim 14, wherein the AD type device comprises one of a type II device and a type III device.

22. A translation transceiver device, comprising:
    a 60GHz band receiver for receiving SD type device compatible transmissions;
    a demodulator for demodulating the SD type transmissions;
    a decoder for decoding the demodulated SD type transmissions into received data;
    an AD type encoder for encoding the received data to produce AD type transmitter compatible data;
    an AD type modulator for modulating the AD type transmitter compatible data; and
    an AD type 60GHz band transmitter for transmitting the modulated AD type transmitter compatible data.
    a 60GHz band receiver for receiving AD type device compatible transmissions;
    a demodulator for demodulating the AD type transmissions;
    a decoder for decoding the demodulated AD type transmissions into received data;
    an SD type encoder for encoding the received data to produce SD type transmitter compatible data;
    an SD type modulator for modulating the SD type transmitter compatible data;
    an SD type 60GHz band transmitter for transmitting the modulated SD type transmitter compatible data;
    a beam formable and steerable antenna array, wherein the AD type transmitter and AD type receiver uses the beam formable and steerable antenna array;
    a cradle for mechanically receiving the SD type device; and
    a power source that supplies power to the SD type device for charging or power the SD type device.

23. The translation transceiver device according to claim 22, wherein the power source comprises one of a direct connecting power source and an inductive power source.

24. The translation transceiver device according to claim 22, further comprising first and second clock recovery circuits that recover clock signals from the AD type received signal and the SD type received signal respectively.

25. The translation transceiver device according to claim 22, wherein the SD type device comprises a device with hybrid capabilities of a type I device and a type II device.

26. The translation transceiver device according to claim 22, wherein the AD type device comprises a device with hybrid capabilities of a type II device and a type III device.

27. The translation transceiver device according to claim 22, wherein the SD type device comprises one of a type I device and a type II device.

28. The translation transceiver device according to claim 22, wherein the AD type device comprises one of a type II device and a type III device.

* * * * *